US010437427B2

(12) United States Patent
Su (10) Patent No.: US 10,437,427 B2
(45) Date of Patent: Oct. 8, 2019

(54) SYSTEM AND METHOD FOR TOUCH/GESTURE BASED DEVICE CONTROL

(71) Applicants: Kabushiki Kaisha Toshiba, Minato-ku (JP); Toshiba TEC Kabushiki Kaisha, Shinagawa-ku (JP)

(72) Inventor: William Su, Riverside, CA (US)

(73) Assignees: Kabushiki Kaisha Toshiba, Minato-ku (JP); Toshiba TEC Kabushiki Kaisha, Shinagawa-ku (JP)

( * ) Notice: Subject to any disclaimer, the term of this patent is extended or adjusted under 35 U.S.C. 154(b) by 326 days.

(21) Appl. No.: 15/211,119

(22) Filed: Jul. 15, 2016

(65) Prior Publication Data
US 2018/0018064 A1  Jan. 18, 2018

(51) Int. Cl.
| | | |
|---|---|---|
| *G06F 3/0484* | (2013.01) |
| *G06F 3/0481* | (2013.01) |
| *G06F 3/0488* | (2013.01) |
| *G06F 17/22* | (2006.01) |
| *H04W 4/80* | (2018.01) |
| *H04N 1/00* | (2006.01) |
| *G06F 3/0482* | (2013.01) |

(52) U.S. Cl.
CPC ........ *G06F 3/0482* (2013.01); *G06F 3/04817* (2013.01); *G06F 3/04883* (2013.01); *G06F 17/2247* (2013.01); *H04N 1/00408* (2013.01); *H04W 4/80* (2018.02)

(58) Field of Classification Search
CPC .............. G06F 3/0482; G06F 3/04815; G06F 3/04483; G06F 3/04817; G06F 17/2247; H04W 4/008; H04N 1/00408
See application file for complete search history.

(56) References Cited

U.S. PATENT DOCUMENTS

| | | | | |
|---|---|---|---|---|
| 9,780,289 B2 * | 10/2017 | Kim | ...................... | H01L 41/083 |
| 9,904,438 B2 * | 2/2018 | Park | ...................... | G06F 3/0488 |
| 9,977,539 B2 * | 5/2018 | Lee | ........................ | G06F 3/0418 |

(Continued)

OTHER PUBLICATIONS

"Apple's 3D Touch Is the Start of a New Interface Revolution", published on Oct. 2, 2015 to https://www.wired.com/2015/10/3d-touch-pressure-sensitive-display/, retrieved Jun. 9, 2018.*

(Continued)

*Primary Examiner* — Shourjo Dasgupta
(74) *Attorney, Agent, or Firm* — Ulmer & Berne LLP (57) ABSTRACT

A system and method for document processing includes a three-dimensional touch interface, a processor and associated memory. The processor generates thumbnail image data from received electronic document data and document format data corresponding to the electronic document data and the thumbnail image data. The memory stores associatively the electronic document data, the thumbnail image data and the document format data. The touch interface displays a thumbnail image from the thumbnail image data and generates user input data in accordance with application of one of a plurality of detectable pressure levels to the thumbnail image. The processor commences a document processing operation in accordance with the user input data and the document format data.

19 Claims, 7 Drawing Sheets

(56) References Cited

U.S. PATENT DOCUMENTS

| | | | | |
|---|---|---|---|---|
| 2002/0180709 A1* | 12/2002 | Lichtfuss | | G06F 1/1626 |
| | | | | 345/173 |
| 2007/0206225 A1* | 9/2007 | Shinohara | | H04N 1/00127 |
| | | | | 358/1.16 |
| 2008/0158144 A1* | 7/2008 | Schobben | | G06F 1/3203 |
| | | | | 345/156 |
| 2009/0128859 A1* | 5/2009 | Daos | | H04N 1/32203 |
| | | | | 358/3.28 |
| 2009/0265653 A1* | 10/2009 | Sodhi | | G06Q 30/0207 |
| | | | | 715/772 |
| 2010/0017710 A1* | 1/2010 | Kim | | G06F 3/0414 |
| | | | | 715/702 |
| 2011/0018695 A1* | 1/2011 | Bells | | G06F 3/016 |
| | | | | 340/407.2 |
| 2011/0063248 A1* | 3/2011 | Yoon | | G06F 3/0485 |
| | | | | 345/174 |
| 2011/0316790 A1* | 12/2011 | Ollila | | G06F 3/04883 |
| | | | | 345/173 |
| 2012/0013571 A1* | 1/2012 | Yeh | | G06F 3/044 |
| | | | | 345/174 |
| 2012/0060089 A1* | 3/2012 | Heo | | G06F 1/1647 |
| | | | | 715/702 |
| 2012/0075485 A1* | 3/2012 | Mizutani | | H04M 1/7253 |
| | | | | 348/207.1 |
| 2012/0206498 A1* | 8/2012 | Kai | | G06F 3/0482 |
| | | | | 345/684 |
| 2012/0268408 A1* | 10/2012 | Chen | | H04M 1/72544 |
| | | | | 345/173 |
| 2012/0293551 A1* | 11/2012 | Momeyer | | G06F 3/0488 |
| | | | | 345/633 |
| 2013/0117055 A1* | 5/2013 | Abdic | | G06Q 10/0631 |
| | | | | 705/7.12 |
| 2013/0201131 A1* | 8/2013 | Choi | | G06F 3/0488 |
| | | | | 345/173 |
| 2013/0342501 A1* | 12/2013 | Molne | | G06F 3/0414 |
| | | | | 345/174 |
| 2014/0062675 A1* | 3/2014 | Murata | | G08C 17/02 |
| | | | | 340/12.5 |
| 2014/0359438 A1* | 12/2014 | Matsuki | | G02B 7/36 |
| | | | | 715/702 |
| 2015/0076967 A1* | 3/2015 | Kim | | H01L 41/083 |
| | | | | 310/364 |
| 2015/0077398 A1* | 3/2015 | Yairi | | G06F 3/016 |
| | | | | 345/175 |
| 2016/0026253 A1* | 1/2016 | Bradski | | G02B 27/225 |
| | | | | 345/8 |
| 2016/0188181 A1* | 6/2016 | Smith | | G06F 3/0416 |
| | | | | 715/765 |
| 2016/0364023 A1* | 12/2016 | Bathiche | | G06F 3/0383 |
| 2017/0010740 A1* | 1/2017 | Chuang | | G06F 3/0416 |
| 2017/0039422 A1* | 2/2017 | Eschbach | | G06F 21/64 |
| 2017/0060315 A1* | 3/2017 | Park | | G06F 3/0482 |
| 2017/0083045 A1* | 3/2017 | Shim | | G06F 1/163 |
| 2017/0115799 A1* | 4/2017 | Shih | | G06F 3/0412 |
| 2017/0153737 A1* | 6/2017 | Chawda | | G06F 3/0414 |
| 2018/0004385 A1* | 1/2018 | Lin | | G06F 3/0488 |

OTHER PUBLICATIONS

Craig Tashman, "3D Touch Opens a New Dimension of User Interaction", published on Feb. 1, 2016 to https://techcrunch.com/2016/02/01/3d-touch-opens-a-new-dimension-of-user-interaction/, retrieved Jun. 9, 2018.*

Leomar Umpad, "Perform Quick Actions Using 3D Touch on iPhone 6s and 6s Plus", published on Sep. 29, 2015 to http://www.tech-recipes.com/rx/56758/perform-quick-actions-using-3d-touch-iphone-6s-6s-plus/, retrieved Jun. 9, 2018.*

Georg Essl and Michael Rohs and Sven Kratz, "Use the Force (Or Something)—Pressure and Pressure-Like Input for Mobile Music Performance", published on Jun. 18, 2010 to http://web.eecs.umich.edu/~gessl/georg_papers/NIME10-ForceMusic.pdf, retrieved Jun. 9, 2018.*

* cited by examiner

SYSTEM AND METHOD FOR TOUCH/GESTURE BASED DEVICE CONTROL

TECHNICAL FIELD

This application relates generally to document processing. The application relates more particularly to enhanced viewing, selection and processing of electronic documents by users of portable data devices.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Given the expense in obtaining and maintain MFPs, devices are frequently shared or monitored by users or technicians via a data network. MFPs, while moveable, are generally maintained in a fixed location. Until more recent times, users, which may include individuals or groups such as employees, administrators or technicians administrators of networked MFPs, were also generally in relatively fixed location. A user would typically communicate documents or other information from his or her office or workstation. An administrator or technician would also monitor devices from a workstation.

Users may send document processing jobs, such as a print request, to one or more networked devices. In a typical shared device setting, one or more workstations are connected via a network. When a user wants to print a document, an electronic copy of that document is sent to a document processing device via the network. The user may select a particular device when several are available. The user then walks to the selected device and picks up their job or waits for the printed document to be output. If multiple users send their requests to the same device, the jobs are queued and outputted sequentially.

User devices have become increasingly mobile. Often times users interact with MFPs via personal data devices such as portable notebook computers, handheld devices such as tablet computers, smartphones, or the like. While many portable devices may still be used at a workplace, a user may do so from various workplace locations. Often times a user may have one or more electronic documents stored on a personal data device. Such electronic documents may also be stored on a networked device, such as a server or on a MFP itself. Electronic document files may be stored by a filename which can be user selected or assigned automatically. By way of example, a user may create an electronic document on a word processing application and save it for future reference. A user may also scan one or more paper documents into an electronic format.

If a user wishes to access a stored electronic document, they may not recall a particular file name relegating them to open each document in an application to view it. Once the correct document or documents are located, the user may access an application to print it. The user may have to select a printer, particularly if the user is accessing their electronic document over a portable device. Locating, loading, viewing, selecting and processing of a document can be a time consuming and involved process.

SUMMARY

In accordance with an example embodiment of the subject application, a system for document processing includes a three-dimensional touch interface, a processor and associated memory. The processor generates thumbnail image data from received electronic document data and document format data corresponding to the electronic document data and the thumbnail image data. The memory stores associatively the electronic document data, the thumbnail image data and the document format data. The touch interface displays a thumbnail image from the thumbnail image data and generates user input data in accordance with application of one of a plurality of detectable pressure levels to the thumbnail image. The processor commences a document processing operation in accordance with the user input data and the document format data.

BRIEF DESCRIPTION OF THE DRAWINGS

Various embodiments will become better understood with regard to the following description, appended claims and accompanying drawings wherein:

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Figure 1:
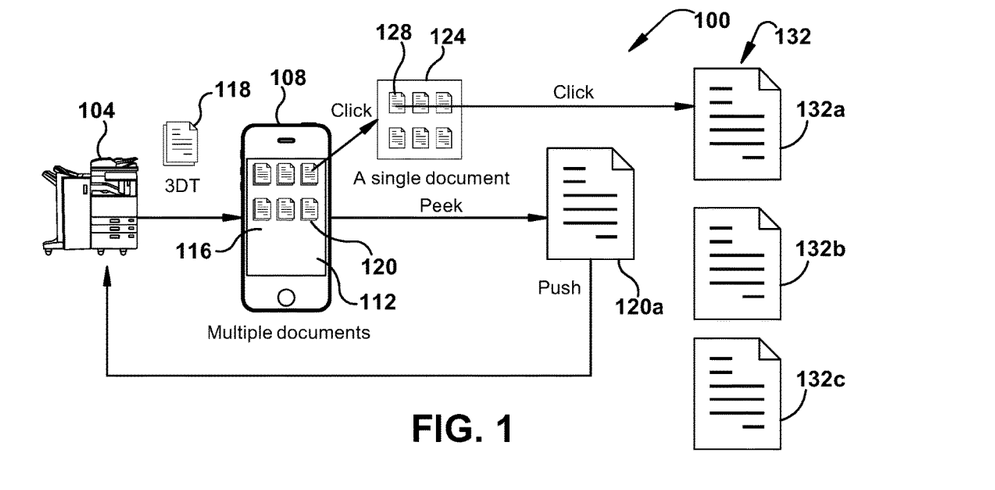
FIG. 1 is an example embodiment of a document processing system.

In accordance with the subject application, FIG. 1 illustrates an example embodiment of a document processing system 100 wherein one or more MFPs, such as MFP 104, are used in conjunction with user devices, such as a portable data device 108, suitably comprised of a tablet computer, smartphone, notebook computer, smart watch, smart eyewear, or the like. A user interface 112 of portable data device 108 is comprised of a three-dimensional touch interface, also referred to as a 3DT interface. A 3DT interface includes functionality of touchscreens, such as a touch sensitive liquid crystal display (LCD), organic light-emitting diode (OLED) display, or the like, which can sense touch motion across one or more portions of the display screen. Unlike standard touchscreens, 3DTs are also capable of sensing relative pressure applied to the display during user operation. Two or more pressure levels are suitably used to select two or more functions. This is also suitably accomplished in conjunction with touchscreen operations, such as selection by touching a specified display area or swipe area. One example of a current, commercial product employing 3DT technology is with force technology employed in the iPhone 6s of Apple, Inc., Cupertino, Calif.

In the example embodiment of FIG. 1, thumbnail area 116 displays thumbnail images of one or more stored documents. Each stored document is comprised of a 3DT document 118 including electronic document data, such as may be from a scanner or word processor, and an encoded file for document behaviors as will be further detailed below. For example, a behavior may direct a print operation, fax operation, or other document processing functions. A user may select one or more documents by touching a thumbnail image or thumbnail image area. In the illustrated example, thumbnail area 116 includes six thumbnail images, including representative thumbnail image 120. Selection of thumbnail area 116 suitably displays a thumbnail image area 124 of a group 128 of documents. Alternatively, one or more documents may be selected by tracing a boundary on the touchscreen with a finger or a stylus, wherein all documents contained in the boundary will be grouped as a group 128 of documents. Selection of a group 128 of documents is also suitably accomplished by selection, such as via a light touch or mouse click. Thus, a user may select all or a portion of a prior subset of the documents of the group 128 for processing by clicking on a common area surrounding the individual thumbnail images, or tracing a boundary around a subset of documents and then clicking, or by individual document selection as noted above. In the example, documents 132, including documents 132*a*, 132*b* and 132*c* are selected. Selected documents are suitably selected for processing by application of pressure in accordance with the example embodiment that follows In the example embodiment of FIG. 1, a selection from thumbnail area 116 is made by exerting a relatively soft pressure touch to the screen area of a thumbnail image 120 which corresponds to a 3DT document 118. It will be understood that similar action may be taken with a group 128 of documents, as taught in the prior example. The relatively soft pressure is suitably greater than that associated with a drawing or clicking motion on the touchscreen, and is referred to as a peek. Application of greater pressure selects thumbnail image 120 for full display of its associated document or documents, such as a scan file or word processing file. A subsequent push, or selected level of pressure on the displayed document 120*a* for processing by MFP 104 higher than that of a click or peek, results in further document processing. Processing is suitably accomplished with preset or selected parameters, such as via one or more MFPs. Selection may be accompanied by other parameter selections or presets, such as collating, stapling, two-sided printing, color printing, black-and-white printing, or the like as will be detailed below.

Figure 2:
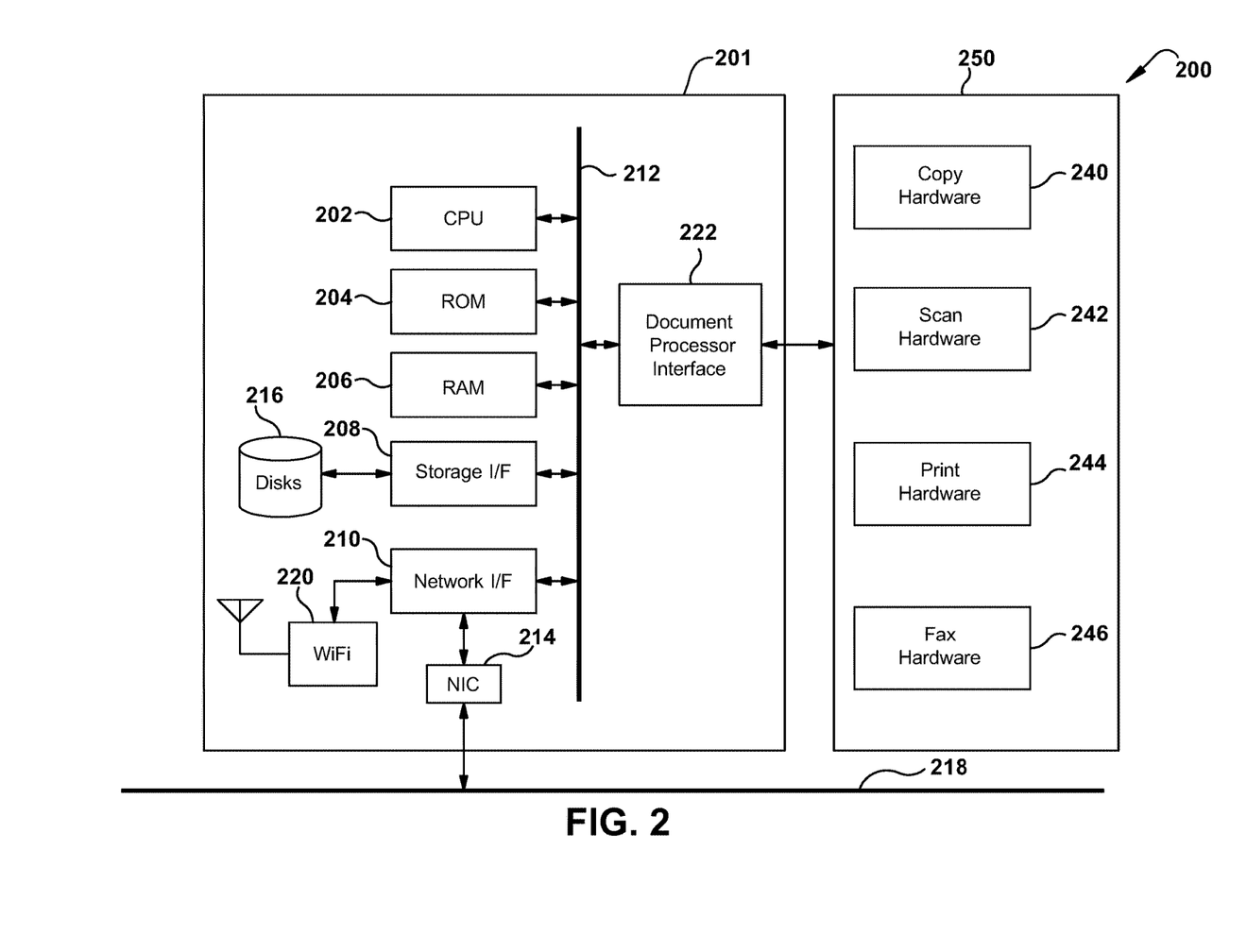
FIG. 2 is an example embodiment of a document rendering system.

Turning now to FIG. 2, illustrated is an example embodiment of a document rendering system 200 suitably comprised within an MFP as described herein. MFPs typically include various functionality including options such as paper selection, stapling, collating, color or black-and-white printing, faxing capability, e-mail capability, contact information, and the like. The example hardware embodiment detailed below suitably provides for any or all of these functions in accordance with an embedded controller 201. Policy data may selectively enable or disable any or all of the MFP capabilities. By way of further example, a visitor may be precluded from making color printouts, or may be constrained to a certain number of printed pages.

Included in controller 201 are one or more processors, such as that illustrated by processor 202. Each processor is suitably associated with non-volatile memory, such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 218, or to a wireless data connection via wireless network interface 220. Example wireless connections include cellular, Wi-Fi, Bluetooth, NFC, wireless universal serial bus (wireless USB), satellite, and the like. Example wired interfaces include Ethernet, USB, IEEE 1394 (FireWire), Lightning, telephone line, or the like. NIC 214 and wireless network interface 218 suitably provide for connection to an associated network (not shown).

Processor 202 can also be in data communication with any suitable user input/output (I/O) interface which provides data communication with user peripherals, such as displays, keyboards, mice, track balls, touch screens, or the like. Also in data communication with data bus 212 is a document processor interface 222 suitable for data communication with MFP functional units 250. In the illustrated example, these units include copy hardware 240, scan hardware 242, print hardware 244 and fax hardware 246 which together comprise MFP functional units 250. It will be understood that functional units are suitably comprised of intelligent units, including any suitable hardware or software platform.

Figure 3:
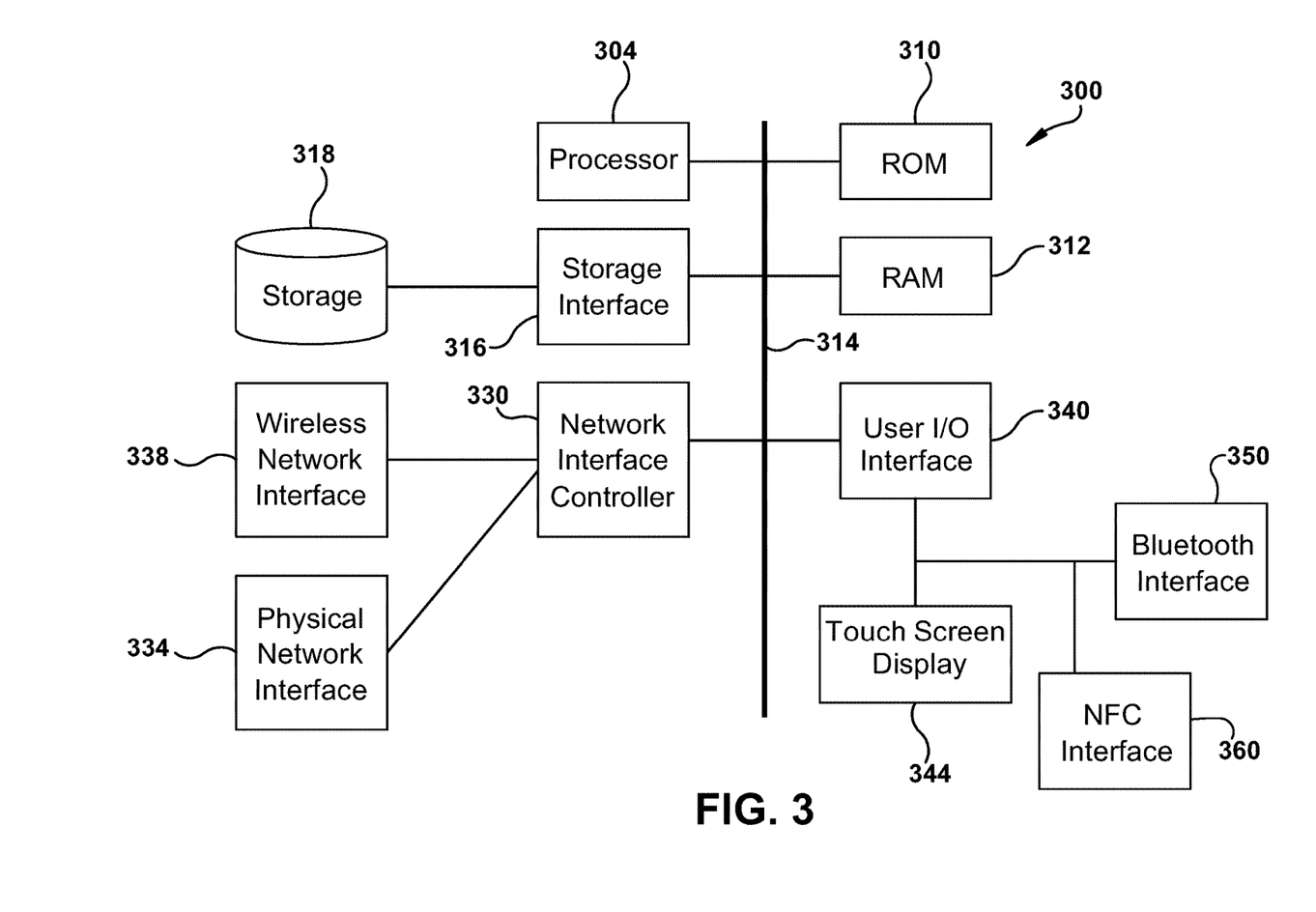
FIG. 3 is an example embodiment of a digital device system.

Turning now to FIG. 3, illustrated is an example embodiment of a digital device system 300 suitably comprising personal or portable data devices, such as user devices described above, as well as servers or network storage as detailed below. Included are one or more processors, such as that illustrated by processor 304. Each processor is suitably associated with non-volatile memory, such as read only memory (ROM) 310 and random access memory (RAM) 312, via a data bus 314.

Processor 304 is also in data communication with a storage interface 316 for reading or writing to a data storage system 318, suitably comprised of a hard disk, optical disk, solid-state disk, or any other suitable data storage as will be appreciated by one of ordinary skill in the art.

Processor 304 is also in data communication with a network interface controller (NIC) 330, which provides a data path to any suitable wired or physical network connection via physical network interface 334, or to any suitable wireless data connection via wireless network interface 338. Example wireless connections include cellular, Wi-Fi, Bluetooth, NFC, wireless universal serial bus (wireless USB), satellite, and the like. Example wired interfaces include Ethernet, USB, IEEE 1394 (FireWire), telephone line, or the like.

Processor 304 is also in data communication with a user input/output (I/O) interface 340 which provides data communication with user peripherals, such as display 344, Bluetooth interface 350, or near-field communication interface 360, as well as keyboards, mice, track balls, touch screens, or the like. It will be understood that functional units are suitably comprised of intelligent units, including any suitable hardware or software platform.

Figure 4:
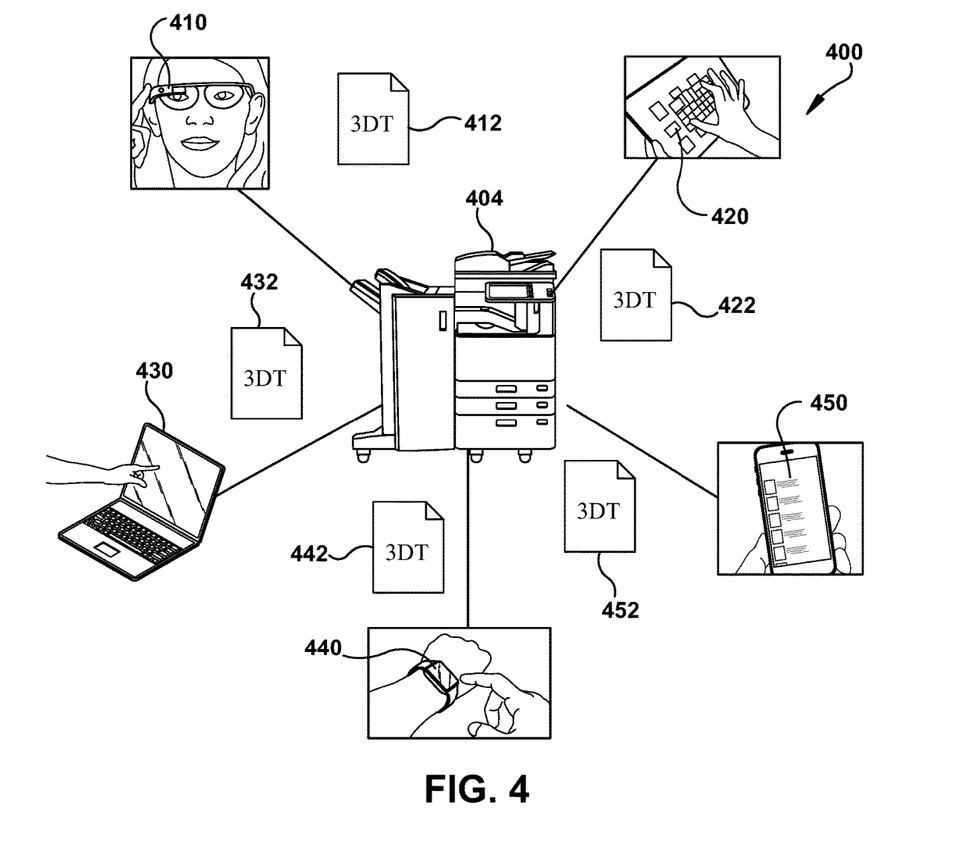
FIG. 4 is an example embodiment of a three-dimensional touch document system.

Referring now to FIG. 4, illustrated is an example embodiment of a 3DT system 400 wherein documents are displayed or selected by various digital user devices for processing in MFP 404. Example include smartglasses 410 and associated 3DT data or 3DT files 412. Further examples include tablet 420 and 3DT file 422, notebook computer 430 and 3DT file 432, smart watch 440 and 3DT file 442 and smartphone 450 and 3DT file 452.

Figure 5:
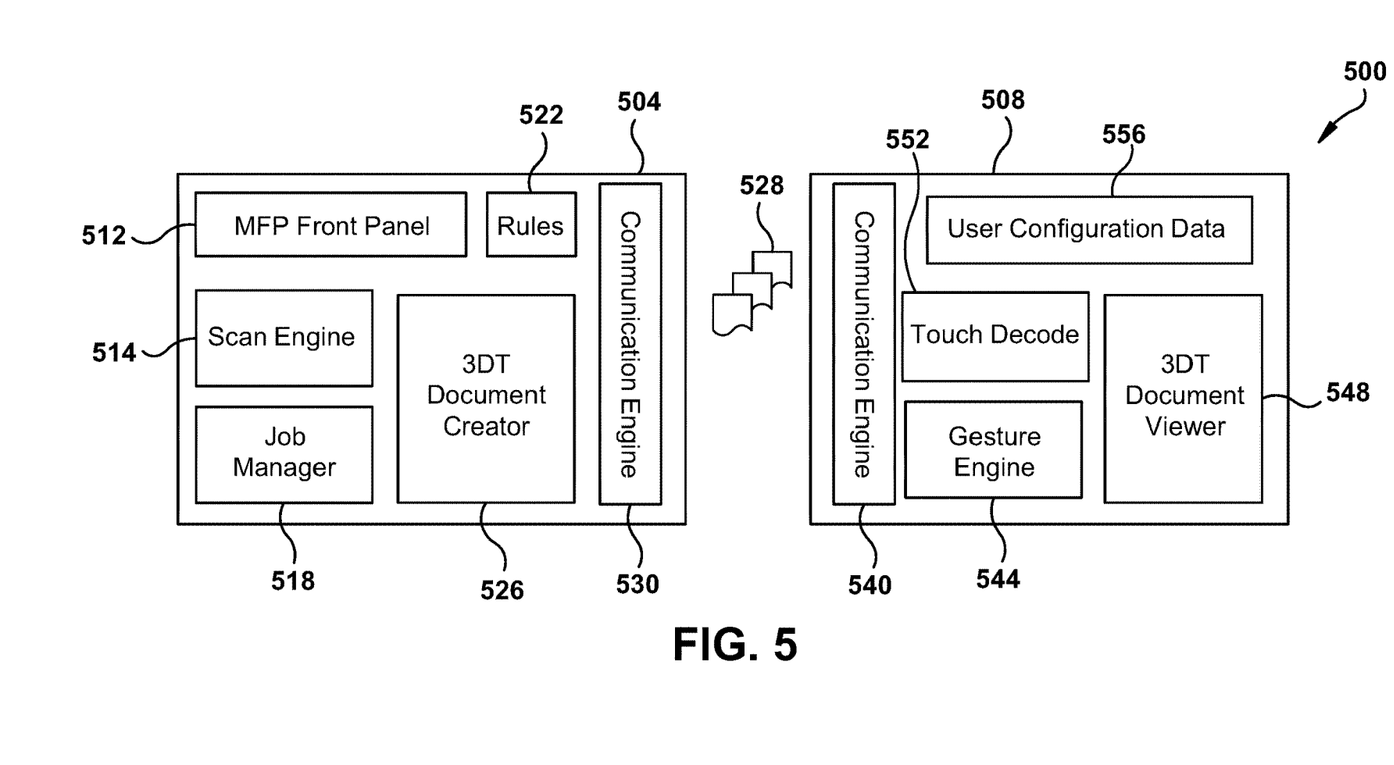
FIG. 5 is an example embodiment of a software module block diagram.

FIG. 5 illustrates an example embodiment of a software module block diagram 500. Software modules are described for MFP 504 and user device 508. MFP 522 includes a front panel 512 as a user interface. Scan engine 514 suitably returns an electronic document resultant from a document scan in conjunction with job manager 518. Rules 522, such as behaviors for document processing, are suitably used in conjunction with 3DT document creator 526. One or more 3DT documents 528 are suitably communicated to user device 508 in accordance with communication engine 530.

User device 508 received 3DT documents 528 via communication engine 544. The user device 508 includes a 3DT touchscreen as detailed above, which displays the user interface in accordance with user configuration data 556, and input is processed by gesture engine 544 suitably used in conjunction with touch decode engine 552. 3DT documents 528 selected for viewing are rendered in conjunction with 3DT document viewer 548.

Figure 6:
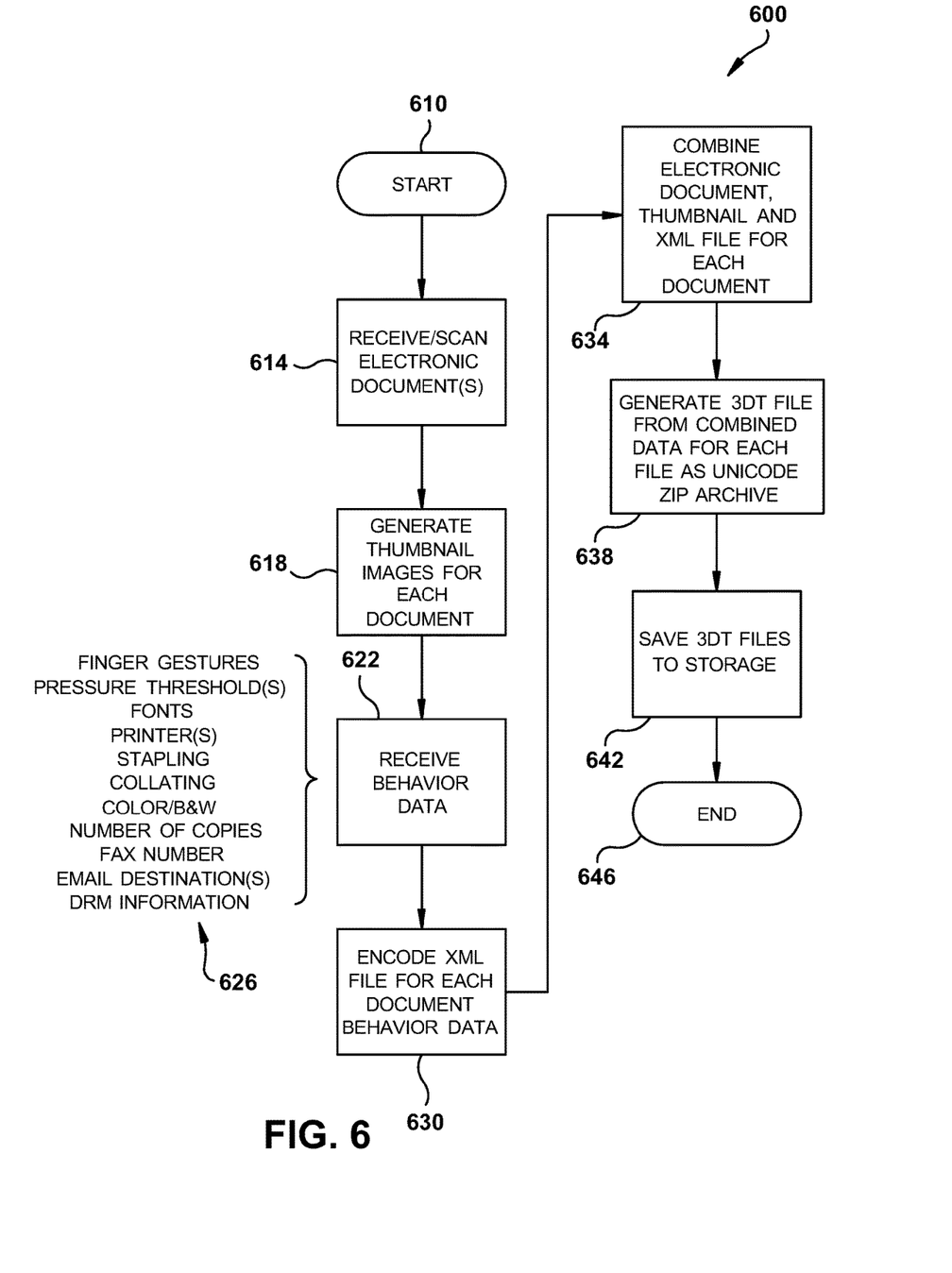
FIG. 6 is a flowchart of an example embodiment of generating three-dimensional touch files.

FIG. 6 illustrates a flowchart 600 of an example embodiment for generating 3DT files. This is suitably implemented on any digital device. In one example embodiment, this is accomplished by an MFP. The process commences at block 610 and proceeds to block 614 wherein electronic documents are received. Documents are comprised of any suitable format such as portable document format (PDF), word processor format, tagged information file format (TIFF), text file, and the like. Documents may be from a user device, from a shared storage, an incoming fax or a scanner. A thumbnail, such as a rendering of a first page of the electronic document, is completed at block 618. Behavior data is retrieved or input at block 622. Behavior data 626 is data associated with documents selection or document processing. Any suitable behavior data 626 is included, such as data for finger gestures, pressure thresholds, fonts, printers, stapling, collating, color, black-and-white, faxing or e-mailing. Behavior data 626 suitably includes data associated with digital right management to control or limit reproduction or transmission of document data.

Next, behavior data 626 is encoded, such as in an extensible markup language (XML) file at block 630. Electronic document thumbnail image data and the XML file are suitably combined at block 364 and assembled at block 368 to generate a 3DT file. The 3DT file is saved at block 642, but also may be communicated to another device, such as a user device, for storage or use, for example as previously described above. The process then ends at block 646.

Figure 7:
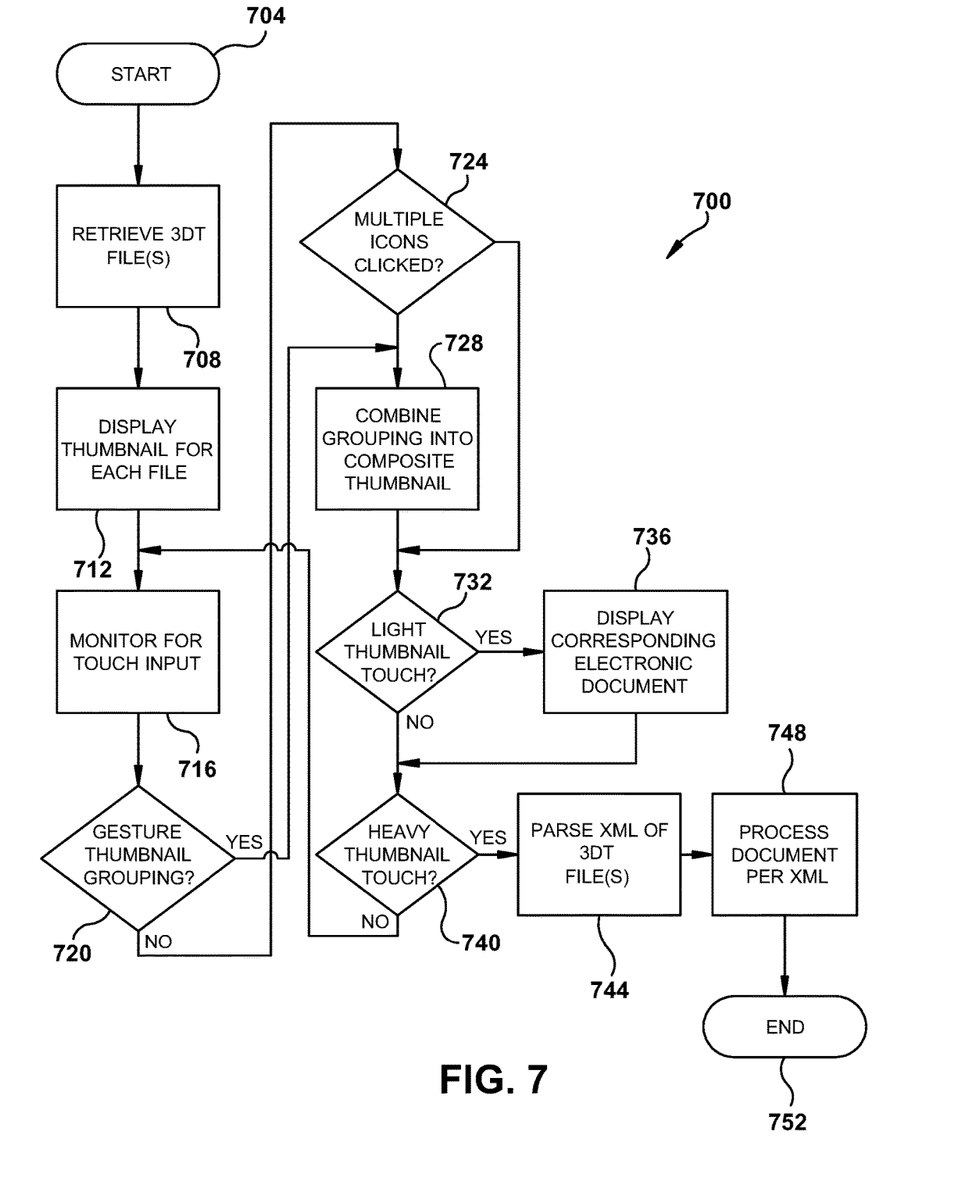
FIG. 7 is a flowchart of an example embodiment of interaction with three-dimensional touch files.

FIG. 7 is a flowchart of an example embodiment of interaction with 3DT files, for example as described above. This is suitably realized on any digital data device, such as a user device. The process commences at block 704 and one or more 3DT files are retrieved at block 708. 3DT files may be stored locally, as in the user device, or may be retrieved from an MFP, file server, shared storage or remote storage. Thumbnail images for one or more 3DT files are displayed on a three-dimensional touch interface at block 712 and monitoring is made at block 716 for user touch input. Testing for gesture based input, such as a swipe, a tap, a line or shape is completed at block 720, and detected gesture input is tested to see if multiple thumbnails are selected. If not, a testing is suitably made to determine if multiple 3DT documents were selected by other means, such as by clicking at block 724. If so, these selections are grouped at block 728. Similarly, gesture-based selection from block 720 also results in a grouping at block 728.

Next, a determination is made at block 732 as to whether a relatively light thumbnail touch is made. Such touch may be to one thumbnail or to a previously identified thumbnail group. A light touch generates a display of each selected document contents with an associated viewer at block 736. If there is no light touch detected at block 732, a test is made at block 740 for a heavier touch. If so, XML files are parsed at block 744 to determine associated behaviors, and corresponding processing is commenced at block 748. The process suitably ends at block 752.

It will be appreciated that the relative touch levels are implemented. However, light touch, heavy touch, or any other pressure level may be applied to any function. For example, it may be advantageous to view a document with a heavy touch and process it with a light touch.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
   an input configured to receive electronic document data comprising a plurality of electronic documents;
   a scanner configured to generate scan document data from a scanned document:
   a printer configured to generate a printout of an electronic document;
   a processor and associated memory,
   the processor configured to generate thumbnail image data from received electronic document data and scan document data,
   the processor further configured to generate document format data corresponding to the electronic document data, the scan document data and associated thumbnail image data, and
   the memory configured to associatively store the electronic document data, the scan document data, the thumbnail image data and the document format data as a unique, three-dimensional touch file; and
   an output configured to communicate each three-dimensional touch file to an associated user device including a three-dimensional touch interface configured to display a plurality of thumbnail images corresponding to the plurality of electronic documents and the scanned document from the thumbnail image data,
   the touch interface further configured to receive user input selecting a subset of the plurality of the thumbnail images, the touch interface further configured generate user input data in accordance with application of one of a plurality of detectable pressure levels to a selected subset of thumbnail images, wherein the processor is further configured to commence a document processing operation to generate a printout of each electronic document associated with the selected subset of thumbnail images via the print engine in accordance with the user input data and the document format data.

2. The system of claim 1 wherein the user input data includes data corresponding to a first force level associated with the application of a pressure on a surface of the touch interface indicative of a selected document processing operation.

3. The system of claim 2 wherein the touch interface is configured to receive the user input selecting the subset of thumbnail images in accordance with a tracing around corresponding thumbnail images and the user input data is generated in accordance with the sensed pressure level associated with a user touch within a boundary formed by the tracing.

4. The system of claim 3 wherein the user input data includes data corresponding to a second force level associated with the application of pressure on the surface of the touch interface.

5. The system of claim 4 wherein the touch interface is further configured to display an image of the electronic document data in accordance with the second force level.

6. The system of claim 5 wherein the user input data includes data corresponding to movement over the surface of the touch interface.

7. The system of claim 6 wherein the processor is further configured to commence a second document processing operation in accordance with movement over the surface of the touch interface.

8. A method comprising:
receiving electronic document data comprising a plurality of electronic documents into a memory;
scanning a tangible document to generate scan document data;
generating, via a processor, thumbnail image data from received electronic document data and scan document data;
generating document format data corresponding to the electronic document data, the scan document data and the thumbnail image data as a unique, three-dimensional touch file;
storing the electronic document data, the scan document data, the thumbnail image data and the document format data associatively in the memory;
communicating the three-dimensional touch file to an associated user device including a three-dimensional touch interface;
displaying a plurality of thumbnail images corresponding to the plurality of electronic documents and the tangible document from the thumbnail image data on the three-dimensional touch interface;
receiving user input via the three-dimensional touch interface selecting a subset of the plurality of thumbnail images;
sensing, on the touch interface, one of a plurality of detectable pressure levels applied to a selected subset of thumbnail images;
generating user input data in accordance with a sensed pressure level; and commencing a selected document processing operation in accordance with the user input data and the document format data, wherein the document processing operation includes printing of each electronic document associated with the selected subset of thumbnail images the electronic document data.

9. The method of claim 8 wherein the user input data is generated in accordance with a first force level associated with the sensed pressure level.

10. The method of claim 9 further comprising receiving the user input selecting the subset of thumbnail images in accordance with a tracing around corresponding thumbnail images and generating the user input data in accordance with the sensed pressure level associated with a user touch within a boundary formed by the tracing.

11. The method of claim 10 wherein the user input data is generated in accordance with a second force level associated with the sensed pressure level.

12. The method of claim 11 further comprising displaying an image of the electronic document data in accordance with the second force level.

13. The method of claim 12 further comprising sensing movement across a surface of the touch interface and wherein the user input data is generated in accordance with the sensed movement across the surface of the touch interface.

14. The method of claim 13 further comprising commencing a second document processing operation in accordance with the sensed movement across the surface of the touch interface.

15. A system comprising:
a scanner configured to generate a first electronic document data from a scanned document;
an input configured to receive at least two additional electronic documents;
a controller including processor and associated memory,
the controller configured to generate thumbnail image data for each electronic document,
the controller configured to generate document format data corresponding to each electronic document and its associated thumbnail image data, and
the memory configured to associatively store each electronic document, its associated thumbnail image data and its associated document format data as a unique three-dimensional touch file;
an output configured to communicate each three-dimensional touch file to an associated user device;
an input configured to receive a user selection of a subset of the electronic documents on the user device;
an input configured to receive selection data corresponding to a pressure application level received from a three-dimensional user interface on the user device,
wherein the controller is further configured to generate a printout of each electronic document of the subset of electronic documents via a print engine in accordance with received selection data.

16. The system of claim 15 wherein the printout of the electronic documents is commenced when the selection data includes data corresponding to a first pressure level.

17. The system of claim 16 wherein the printout is commenced as a facsimile transmission when the selection data includes data corresponding to a second pressure level.

18. The system of claim 15 wherein the printout is commenced when the selection data includes data corresponding a gesture received by the three-dimensional user interface on the user device.

19. The system of claim 15 wherein the controller is further configured to generate the document format data as an extensible markup language file.

\* \* \* \* \*